United States Patent [19]

Willkie et al.

[11] Patent Number: 5,956,651
[45] Date of Patent: Sep. 21, 1999

[54] CELLULAR TELEPHONE INTERFACE SYSTEM FOR AMPS AND CDMA DATA SERVICES

[75] Inventors: James J. Willkie, Poway; Marc S. Phillips; David B. Doan, both of San Diego, all of Calif.

[73] Assignee: Qualcomm Incorporated, San Diego, Calif.

[21] Appl. No.: 08/723,493

[22] Filed: Sep. 30, 1996

[51] Int. Cl.$^6$ .................................................. H04Q 7/32
[52] U.S. Cl. ........................................ 455/553; 455/558
[58] Field of Search ................................ 455/553, 557, 455/558, 559

[56] References Cited

U.S. PATENT DOCUMENTS

| | | | |
|---|---|---|---|
| 5,249,218 | 9/1993 | Sainton | 379/59 |
| 5,408,520 | 4/1995 | Clark et al. | 455/557 |
| 5,479,479 | 12/1995 | Braitberg et al. | 455/557 |
| 5,479,480 | 12/1995 | Scott | 455/553 |
| 5,564,077 | 10/1996 | Obayashi et al. | 455/553 |

FOREIGN PATENT DOCUMENTS

| | | | |
|---|---|---|---|
| 9429968 | 12/1994 | WIPO | H04B 1/38 |
| 9514359 | 5/1995 | WIPO | H04Q 7/32 |
| WO 95/14359 | 5/1995 | WIPO . | |
| 9807285 | 2/1998 | WIPO | H04Q 7/22 |

OTHER PUBLICATIONS

Michael S. K. Sushko, "Advanced Data Services for Wireless Communication Networks", *IEEE*, Jul. 25, 1995, pp. 331–335.

*Primary Examiner*—Andrew M. Dolinar
*Attorney, Agent, or Firm*—Russell B. Miller; Brian S. Edmonston; Charles D. Brown

[57] ABSTRACT

The cellular telephone interface system has the capability to automatically choose between AMPS and CDMA cellular transmission protocols for data transmissions. The cellular telephone interface system includes a PC-modem card, such as a PCMCIA card, for interconnecting the cellular telephone to a data source, such as a laptop computer, portable facsimile machine, or the like. The cellular telephone is capable of transmission in accordance with either AMPS or CDMA transmission protocols. For AMPS, the PC-modem card converts data signals received from the data source into PCM signals for forwarding to the cellular telephone. The cellular telephone converts the PCM signals into AMPS formatted signals for transmission to a local cellular base station. For CDMA transmission, the PC-modem card converts the data signals received from the data source into RS-232E signals for transmission to the cellular telephone. The cellular telephone converts the RS-232E signals into CDMA formatted signals for transmission to the local base station. A variety of data formatting and data compressing protocols are also provided including TCP, IP, PPP and V42.bis. In one embodiment, hardware and software for implementing the protocols are provided primarily within the PC-modem card to thereby reduce the cost, size and power consumption of the cellular telephone itself. In another embodiment, hardware and software for implementing the TCP, IP and PPP protocols are provided within the cellular telephone. Method and apparatus embodiments of the invention are disclosed.

13 Claims, 9 Drawing Sheets

CELLULAR TELEPHONE INTERFACE SYSTEM FOR AMPS AND CDMA DATA SERVICES

BACKGROUND OF THE INVENTION

I. Field of the Invention

The invention generally relates to cellular telephones and in particular to cellular telephones configured for receiving and transmitting data.

II. Description of the Related Art

Computer users often utilize wireless cellular telephone systems to engage in mobile data communications. Presently, there are two prominent types of cellular telephone systems: analog cellular telephone systems, commonly referred to as AMPS systems, and digital cellular telephone systems, which include code division multiple access (CDMA) systems and time division multiple access systems (TDMA). To perform data communications via a circuit switched connection using an AMPS cellular telephone system, the digital data must first be converted into tones via the use of a modem. Modems are also employed for communication via the standard wirebased public switch telephone network (PSTN). To network using a digital cellular telephone system, the digital data is provided directly to the cellular telephone which processes the data in its digital form. To allow for maximum flexibility, most digital cellular telephones can properly interface with both digital cellular telephone systems as well as AMPS cellular telephone systems.

To interface a portable "laptop" computer with a cellular telephone configured for analog operation, the user generally uses a modem configured in the shape of a thin card that is placed in a slot in the computer. The modem outputs tones which can then be fed into the cellular telephone via the use of a cable. This configuration of both the modem and the computer is in accordance with the Personal Computer Memory Card International Association (PCMCIA) standard, which was adopted in order to facilitate ease of use and mobility. To interface the laptop computer with a cellular telephone configured for digital operation, a digital output port of the computer must be coupled to the cellular telephone, also via the use of a cable. The digital output port is typically configured in accordance with the RS-232 standard which calls for the digital data to be output in digital signals of plus or minus twelve volts.

FIG. 1 illustrates a laptop computer and cellular telephone configured for mobile networking. A laptop computer 2 and a cellular telephone 4 are shown along with an RS-232 cable 5 for CDMA and an AMPS connection line 7. The laptop computer includes a serial port 6 for the RS-232 line and a slot for receiving a PCMCIA card 8 connected to the AMPS connection cable. The cellular telephone includes only a single input terminal 9. Hence, either the RS-232 cable or the AMPS cable, but not both, can be connected to the cellular telephone. Thus, the user must know in advance which connection line is required and connect the correct connection line to the cellular telephone.

For the foreseeable future, both AMPS and digital telephone systems are expected to coexist, and therefore a cellular telephone user will need to have the capability to interface with both types of systems. As described above, however, two different methods for interfacing the laptop computer with the cellular telephone and the associated signal processing are required for the two different systems. The use of two different methods for interfacing is inconvenient for the user, as he or she must reconfigure the connection between the computer and phone depending on the type of interface being conducted. Thus, a method for allowing wireless networking to be conducted in accordance with both digital and analog operation without the need for reconfiguration would be highly desirable. One such method is described in copending U.S. Pat. application Ser. No. 08/636,261 entitled "DATA COMMUNICATION USING A DUAL MODE RADIOTELEPHONE" assigned to the assignee of the present invention and incorporated herein by reference.

Another problem in providing mobile networking using both the AMPS and CDMA interface relates to selecting which of various data transmission protocols, formats and compression standards are to be provided. Recently, a wide range of protocols, formats and compression standards have been developed for facilitating data transmission each requiring its own unique software, hardware, or both. The methods include error correction protocols as well as packet interface protocols such as TCP/IP. The cost and power consumption associated with supporting these various methods is typically substantial relative to the normal computing capacity of a cellular telephone. While additional computing capacity could be incorporated into the phone, this would increase the phones cost, size and power consumption, which adversely affects mobility. Additionally, these desired protocols may change over time, causing the software in the phone to become obsolete. Accordingly, it is not necessarily feasible, or even desirable, to provide for all possible data transmission protocols within a cellular telephone. Therefore, it is desirable to configure and arrange the necessary hardware and software in a manner which allows networking to take place, but which also minimizes costs and power consumption to the cellular telephone itself, and which facilities upgrades to the type of networking that can be conducted. It is to these ends that the invention is also drawn.

SUMMARY OF THE INVENTION

In accordance with the invention, a cellular telephone system for transmitting data received from a data source, such as a laptop computer or facsimile machine, to a local cellular base station using either AMPS or CDMA protocols is provided. In an exemplary embodiment, the system includes a personal computer accessory "PC-modem" card, such as a PCMCIA card, for connecting the data source to a cellular telephone. The PC-modem card includes means for transferring data between the data source and the cellular telephone. In an AMPS mode, the data is transferred as pulse code modulated (PCM) signals. In a CDMA mode, the data is transferred as RS-232E signals.

The cellular telephone includes AMPS processing means for receiving PCM data from the PC-modem card and transmitting the data using AMPS format signals to a local base station. The cellular telephone also includes CDMA processing means for receiving RS-232 data from the PC-modem card and transmitting the data using CDMA format signals to the base station. A single interconnection cable interconnects the PC-modem card and the cellular telephone. The single connection line includes individual lines for carrying both PCM signals and RS-232E signals. Hence, only a single connection port on the cellular telephone is required. Also, only a single connection port (the PCMCIA card slot) is required on the laptop computer.

In one embodiment, the means for transferring data between the data source and the cellular telephone includes means, including an AT control system, for interpreting AT commands, which are well known in the art, a data processing unit, a modem, and a CODEC (coder-decoder), for converting signals received from the data source into PCM tone signals suitable for transmission to the cellular telephone while in the AMPS mode. The use of PCM tones facilitates manipulation and processing of the associated data and therefore is preferred, however, uncoded analog data samples may also be used in alternative embodiments of the invention. The means for transferring also includes means, including the AT control system and a level converter unit, for converting signals received from the data source into RS-232E signals for transmission to the cellular telephone while in CDMA mode.

The data processing unit within the PC-modem card additionally includes means for performing data processing functions including encoding and/or compressing received data in accordance with any of the following formats: IS-99, EIA-617, RFC854, V42.bis, TCP, IP and PPP, all of which are well known in the art. The data processing unit may also perform error correction, flow control and other related functions. The PC-modem card may additionally include a telephone line port for interfacing the modem with a conventional land line, such as a public switched telephone network (PSTN) telephone line for land line communications. It should be noted that this is somewhat in contrast with the IS-99 specification which implies, but does not require, that all IS-99 services are to be performed within the cellular telephone itself.

Hence, with the invention, data communication functionality is split between the cellular telephone and the PC-modem card, with much of the functionality being provided in the PC-modem card rather than in the cellular telephone. In default mode, the data communication components automatically choose between AMPS and CDMA such that no user action is required. Additionally, the user may override this automatic selection by forcing the selection of either AMPS or CDMA. By providing a PC-modem card for interconnection between the data source and the cellular telephone, data transmission capabilities are conveniently provided without substantially increasing the size and cost of the cellular telephone itself and without significantly increasing power consumption by the cellular telephone. Users who do not require data transmission capability merely purchase the cellular telephone. Users requiring data transmission capability obtain the cellular telephone and the PC-modem card. Power consumption within the cellular telephone is not significantly increased, in part, because the data processing components of the PC-modem card draw power from the data source, rather than from the power source of the cellular telephone.

In one specific embodiment, interconnection between the PC-modem card and the cellular telephone is facilitated by an interface device which may additionally include a microphone and speaker to provide "hands-free" conversation capability when operating in voice mode. In another specific embodiment the TCP, IP and PPP components reside within the cellular telephone, rather than within the PC-modem card.

Hence, a cellular telephone is provided which is capable of operating either in AMPS or CDMA modes for both voice conversations or data transmissions. Typically, no significant action is required by the user to switch from one to the other. This is a significant advantage over systems wherein the user must first determines the type of transmission (AMPS or CDMA) then configure the system accordingly. Indeed, depending upon the local cellular telephone carrier, the selection of AMPS or CDMA may be entirely transparent to the user. For data transmission, the user merely dials the telephone number of the entity to which data is to be transmitted to or from and the cellular telephone and PC-modem card determines the appropriate cellular transmission protocol and data transmission protocol for receiving and transmitting data.

DETAILED DESCRIPTION OF EXEMPLARY EMBODIMENTS OF THE INVENTION

With reference to the figures, exemplary embodiments of the invention will now be described. The exemplary embodiments are described primarily with reference to block diagrams and flowcharts. As to the flowcharts, each block within the flowchart represents both a method step and an apparatus element for performing the method step. Herein, the apparatus element may be referred to as a means for, an element for, or a unit for performing the method step. Also, it should be appreciated that not all components or method steps necessary for complete implementation of a practical system are always illustrated or described in detail. Rather, only those components or method steps necessary for a thorough understanding of the invention are illustrated and described. Furthermore, components or method steps which are either conventional or may be readily designed and fabricated or performed in accordance with the teachings provided herein are not described in detail.

Figure 1:
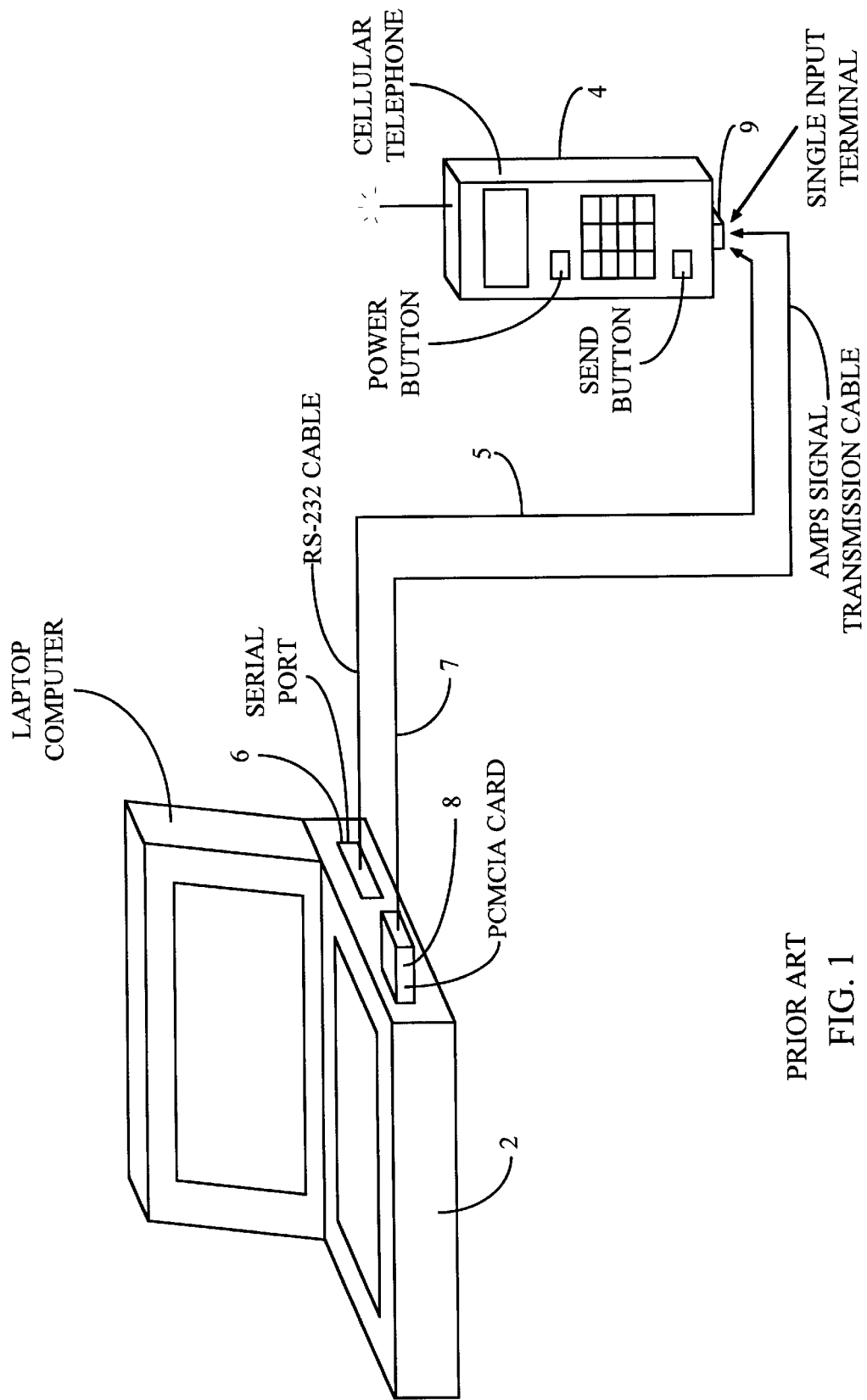
FIG. 1 is a perspective view of a laptop computer, cellular telephone, and separate CDMA and AMPS interconnection cables.
Figure 2:
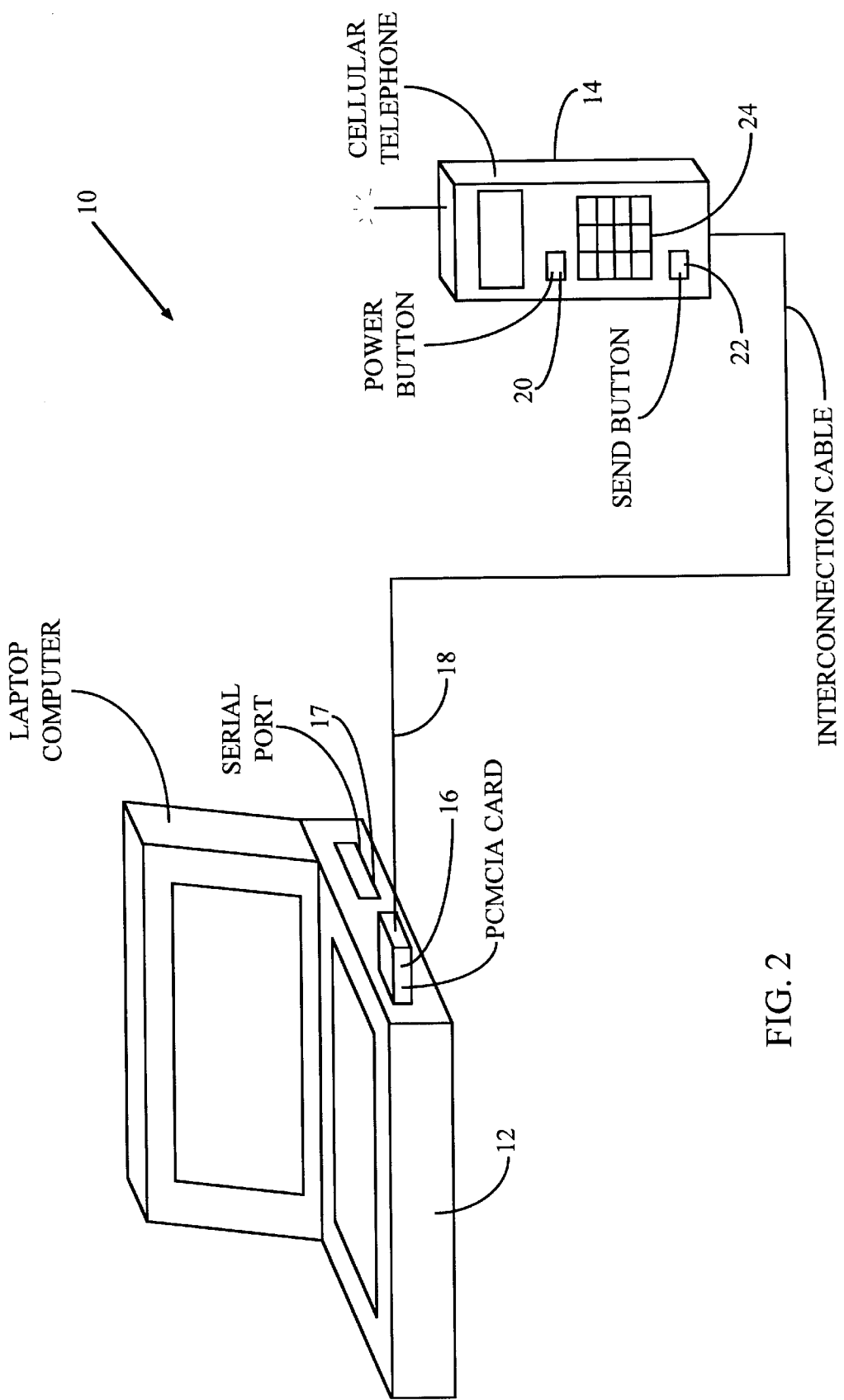
FIG. 2 is a perspective view of a laptop computer, PC-modem card and cellular telephone, configured in accordance with the invention.

FIG. 2 illustrates a system 10 having a laptop computer 12, cellular telephone 14 and PC-modem card 16 interconnected by one inter-connection line 18. Data signals generated by laptop computer 12 are transmitted by PC-modem card 16 to cellular telephone 14 over line 18 for cellular transmission to a remote cellular base station (not shown). The signals received by the base station are ultimately transmitted to a remote computer (also not shown) which, for example, may form part of the Internet. Responsive signals generated by the remote computer are ultimately transmitted by the base station and received by cellular telephone 14, then routed along line 18 through PC-modem card 16 to laptop computer 12. In the exemplary embodiment described herein, cellular transmission is performed using either AMPS or CDMA protocols, but other pairs of protocols may alternatively be employed in other embodiments. The interconnection line includes serial transmission lines for transmitting signals when operating using CDMA protocols and PCM lines for transmitting signals when operating when using AMPS protocols. Serial transmission of data signals over line 18 is performed using the EIA/TIA-RS-232E interface protocol (subject to differing voltages than specified in the protocol), but alternative protocols may be employed. The EIA/TIA-RS-232E interface protocol may be found in a document entitled "Interface Between DTE and DCE Employing Serial Binary Data Exchange" provided by the Telecommunications Industry Association. Although a laptop computer is shown in the drawings, it should be understood that any type of data source may be employed including any type of portable or non-portable computer as well as other data sources such as personal data assistants, facsimile machines, etc. The PC-modem card may be any type of accessory card such as a PCMCIA card. Also, as shown, the laptop computer may include a separate serial port 17 which, by virtue of the invention, is not required for transmitting data signals to the cellular telephone and therefore may be employed for other purposes.

The cellular telephone includes a power button 20, a send button 22 and a keypad 24. The telephone is activated by a user by pressing the phone button. For voice transmissions, the user enters a desired telephone number using keypad 24, then presses the send button. For data communications, the desired telephone number is provided by the laptop computer and the send function is automatically activated by the cellular telephone. In an embodiment to be described below, a "car kit" interface is provided between the interconnection cable and the cellular telephone. The interface includes a speaker and microphone adapted for hands-free operation which may, for example, be employed by a user while operating the cellular telephone when driving a vehicle.

For data transmissions, a telephone number is provided by the laptop computer either from a storage device contained therein or from user entry via a keyboard of the computer. The telephone number is forwarded to the cellular telephone by the PC-modem card. Any necessary control handshakes between the PC-modem card and the cellular telephone are performed as well. The cellular telephone attempts to contact the local cellular system to obtain a traffic channel, first using CDMA protocols, then, if a CDMA traffic channel is unavailable, using AMPS protocols. Assuming a traffic channel is obtained, the cellular telephone transmits appropriate signals to the PC-modem card identifying whether the channel is a CDMA or an AMPS channel. The cellular telephone also proceeds to place the telephone call using the traffic channel to the desired telephone number.

Assuming that the telephone call is connected, data to be transmitted from the laptop computer is forwarded to the PC-modem card as data transmission signals. If the operational mode is CDMA, the PC-modem card converts the received data signals to RS-232E signals for transmission over the serial portion of the interconnection cable. The cellular telephone converts the RS-232E signals into signals appropriate for CDMA transmission, then transmits the signals to the local base station. Responsive signals, received by the cellular telephone, are converted to RS-232E signals therein, then transferred to the PC-modem card for conversion to conventional data signals for subsequent transference to the laptop computer.

For the AMPS mode of operation, the signals received by the PC-modem card from the laptop computer are converted to PCM signals and forwarded to the cellular telephone over the PCM lines of the interconnection cable. The cellular telephone converts the PCM signals to AMPS protocol signals for transmission to the local base station. Responsive AMPS signals are converted by the cellular telephone to PCM signals, forwarded over the interconnection cable to the PC-modem card for conversion to modulated data signals for subsequent transference to the laptop computer.

Figure 3:
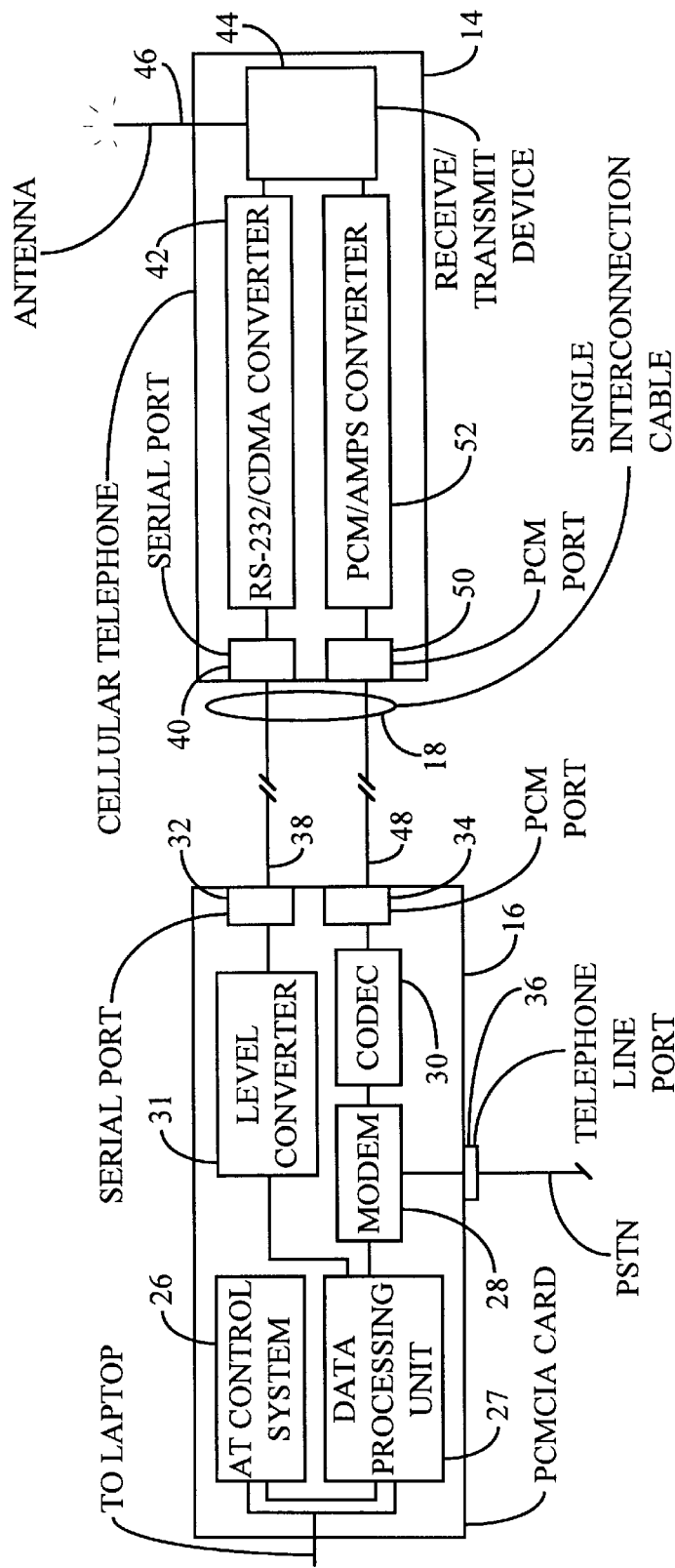
FIG. 3 is a block diagram illustrating, at a high level, pertinent internal components of the PC-modem card and cellular telephone of FIG. 2.

Components of the PC-modem card and the cellular telephone employed in facilitating either AMPS or CDMA protocol transmissions are shown in FIG. 3. More specifically FIG. 3 illustrates that the PC-modem card 16 includes a AT control system 26, a data processing unit 27, a modem 28, a CODEC 30 and a level converter unit 31. The PC-modem also includes a serial port 32 and a PCM port 34 for receiving appropriate portions of the interconnection cable 18. It should be understood that, in the preferred embodiment of the invention, PCM port 34 and serial port 32 are located within a single physical connector into which the cable connector is inserted. The PC-modem card also includes a telephone line port 36 for receiving a land line, such as a PSTN telephone line.

Collectively, the AT control system, data processing system, modem and CODEC provide a means for converting data signals received from the laptop computer into PCM signal for transferring to the cellular telephone in AMPS mode. The AT control system, data processing system, and level converter unit provide a means for converting data signals received from the laptop computer into RS-232E signals for transferring to the cellular telephone in CDMA mode.

More specifically, data signals generated by the laptop computer (FIG. 2) are received by the AT control system and the data processing unit. The AT control system extracts AT commands from the signals and controls operation of the data processing unit in accordance with those commands. For AMPS mode, the data signals are encoded and formatted by the data processing unit, converted to tones by the modem, then converted to PCM signals by the CODEC. The resulting PCM signals are output through the PCM port onto PCM lines of the interconnection cable. The signals are received by a PCM port 50 of the cellular telephone, converted to AMPS format signals by a PCM/AMPS converter 52, then routed to a receive/transmit device 44 for eventual transmission by an antenna 46. Responsive signals follow the opposite path for conversion within the cellular telephone from AMPS signals to PCM signals and for conversion within the PC-modem from PCM signals to data signals for subsequent transference to the laptop computer.

If a PSTN line is connected to the modem, then the tone signals output from the modem are routed onto the PSTN line, rather than to the CODEC.

For CDMA mode, the AT control system also extracts AT commands from the data signal and controls the operation of the data processing unit in accordance with those commands, perhaps to encode the data signal in accordance with a selected protocol or data compression format. The resulting data signals are output from the data processing unit as RS-232E signals to the level converter unit. The level converter unit 31 modifies the voltage level of the signals from the level output by the data processing unit (perhaps +3.3V to 0.0V) to a voltage range appropriate for RS-232E serial connection line transmission (typically +12V to −12V). The resulting signals are output through serial port 32 onto serial connection lines of the interconnection cable.

The signals are received within the cellular telephone through a serial port 40 and are routed to an RS-232/CDMA converter 42, the operation of which is described in greater detail before. The RS-232E signals are converted therein into CDMA protocol signals for routing to the receive/transmit device for subsequent transmission via the antenna. Responsive CDMA signals follow the opposite path for conversion within the cellular telephone to RS/232 signals and for conversion within the PC-modem card into signals for subsequent transference to the laptop.

With this arrangement, AMPS and CDMA data transmission capabilities are provided within the cellular telephone merely by providing appropriate conversion hardware and software for handling RS-232E signals and PCM signals. Other aspects of the processing of the data signals is performed within the PC-modem card. Accordingly, power consumption by the cellular telephone is limited and cost associated with the cellular telephone are also limited.

Figure 4:
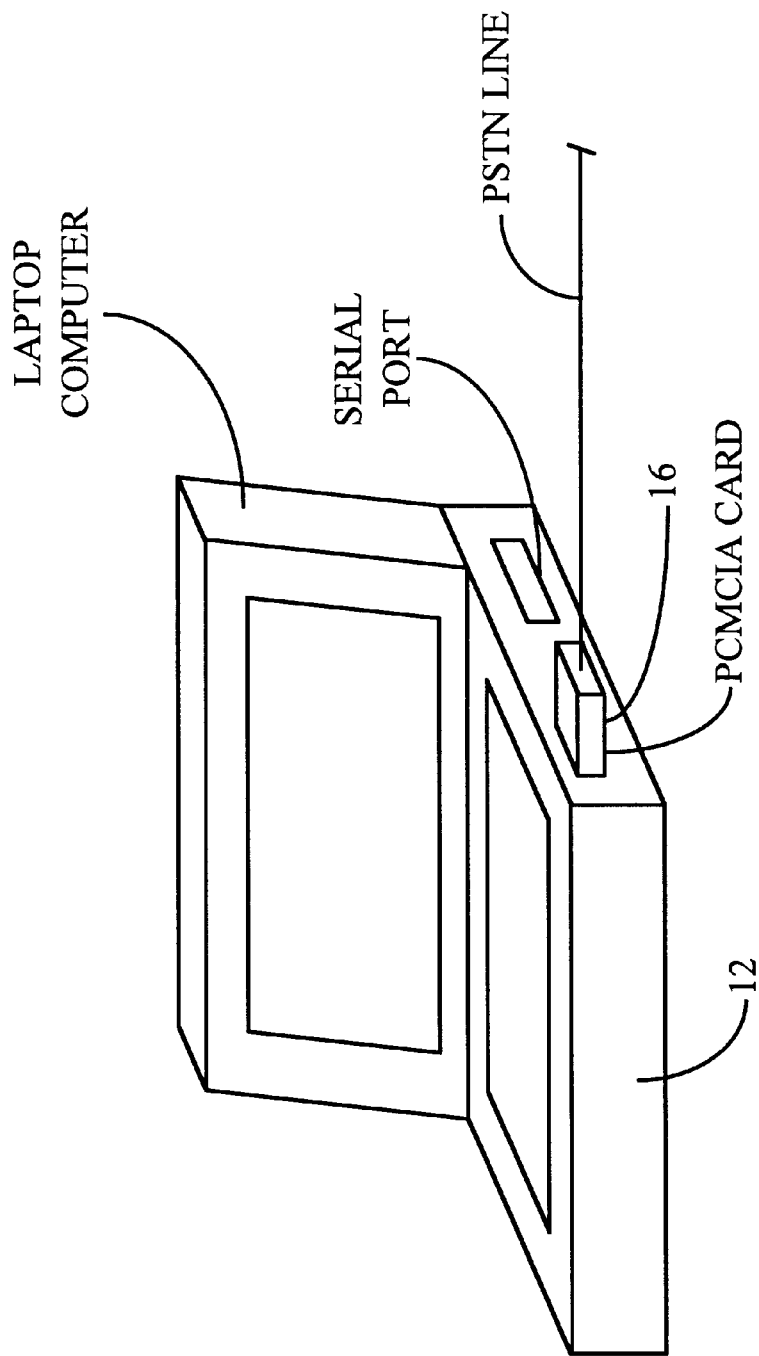
FIG. 4 is a perspective view of the laptop computer and PC-modem card of FIG. 2 interconnected to a PSTN line, also in accordance with the invention.

As noted, the PC-modem card may be connected to a conventional land line. This is illustrated in FIG. 4.

Depending upon the implementation, it may be necessary or desirable to format, compress or otherwise process the data to be transmitted in accordance with one of a variety of standards such as V42.bis, TCP, IP, etc.

Figure 5:
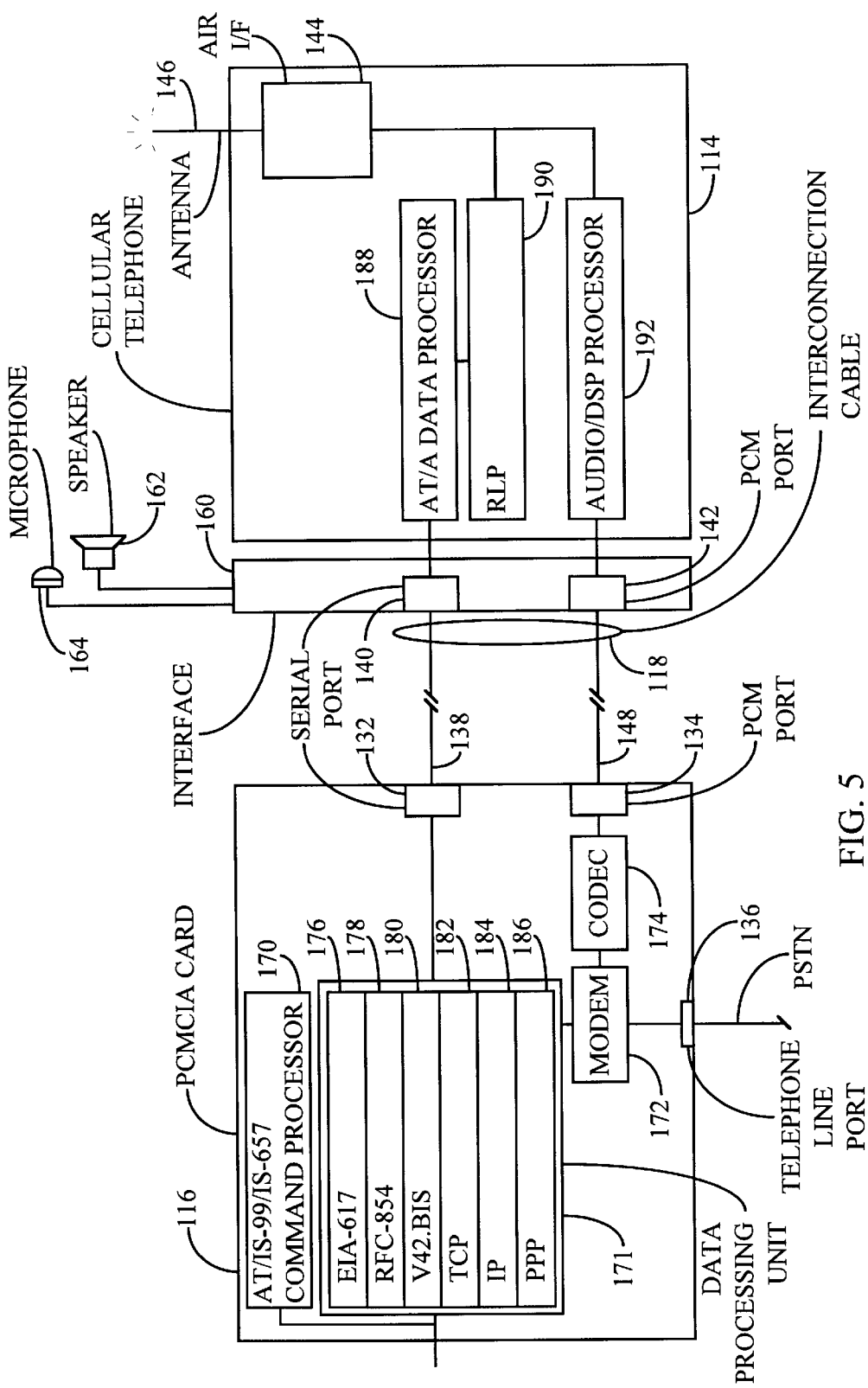
FIG. 5 is a block diagram of a specific exemplary embodiment of the PC-modem card and cellular telephone of FIG. 2 wherein internal components of the card and telephone are partitioned in accordance with a first embodiment.
Figure 6:
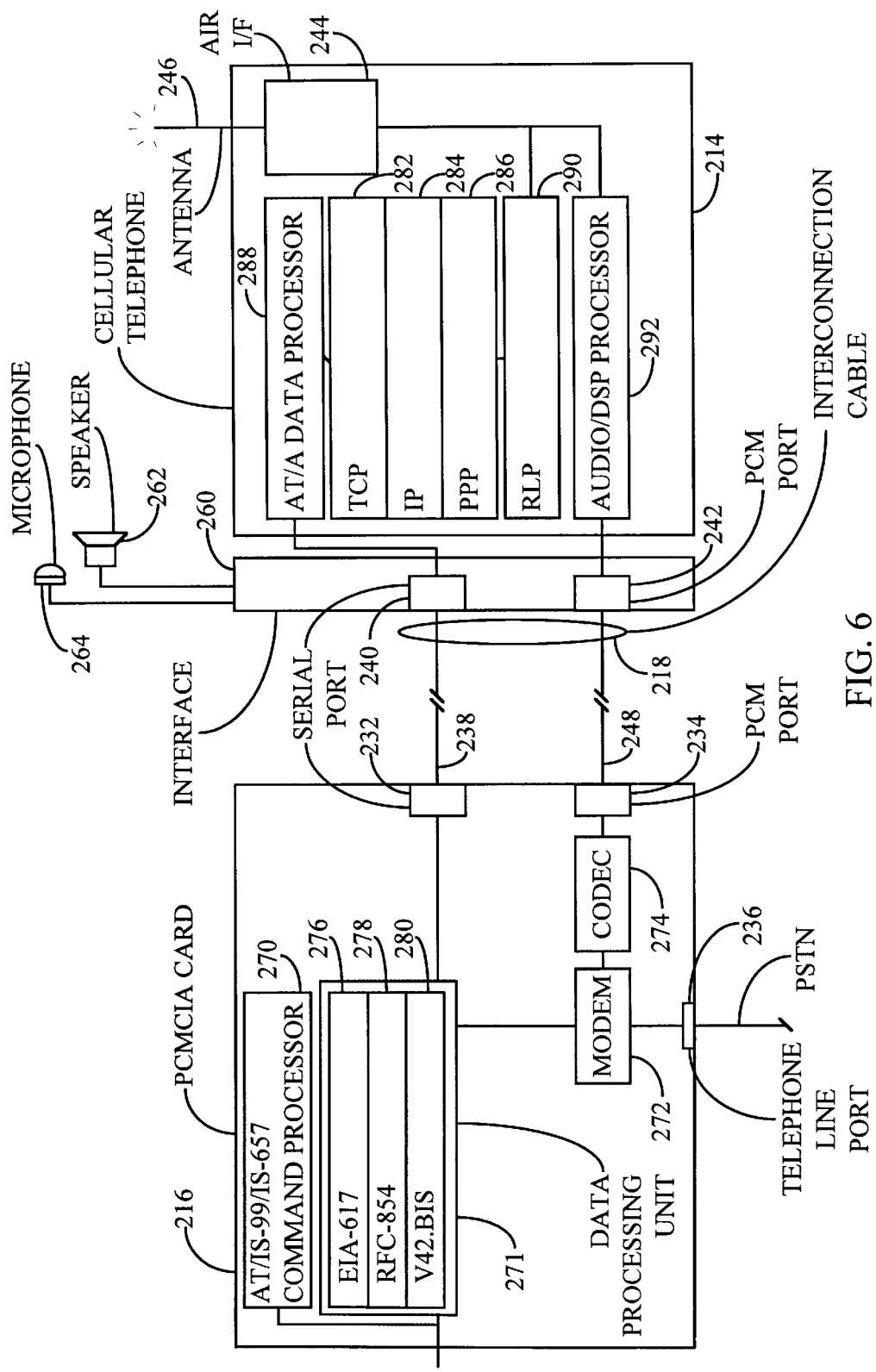
FIG. 6 is a block diagram of the PC-modem card and cellular telephone of FIG. 2 wherein internal components of the card and telephone are partitioned in accordance with a second embodiment.

Indeed, for CDMA transmissions under IS-99 standard, TCP, IP and PPP protocols must be supported. FIGS. 5 and 6 illustrate two specific embodiments wherein hardware/software components appropriate for various formats or protocols are partitioned between the PC-modem card and the cellular telephone. Both embodiments include an interface 160 (shown below in FIGS. 5 & 6) between the interconnection cable and the cellular telephone. The interface 160 is the aforementioned "car kit" interface providing a hands-free speaker and microphone. The interface 160 is not necessary for implementation of the invention and, in many embodiments, will not be provided. Additionally, level converter unit 31 is not shown for ease of drawing.

Referring first to FIG. 5, a cellular telephone 114 and a PC-modem card 116 are shown. The PC-modem card includes a serial port 132, a PCM port 134 and a -PSTN telephone line port 136. The cellular telephone includes an air I/F receive/transmit device 144 and an antenna 146. An interface 160 is provided between the interconnection cable 118 and the cellular telephone. The interface includes a serial port 140 and a PCM port 142. Signal intercommunication between the interface and the cellular telephone may be provided through additional serial and PCM ports (not shown) or by any other suitable form of interconnection components.

Interface 160 also includes a speaker 162 and a microphone 164 of the type suitable for implementing hands-free operation. As such, the cellular telephone with interface may be used while operating the vehicle without requiring the user to speak directly into, and listen directly from, the speaker and microphone of the cellular telephone itself (not separately shown).

Data processing hardware/software for accommodating different transmission formats or protocols are partitioned between the PC-modem card and the cellular telephone as follows. The PC-modem card includes an AT/IS-99 command processor 170, a modem 172 and a CODEC 174. The PC-modem card also includes a data processing unit 171 having a suite of formatting units including an EIA-617 unit 176, an RFC-854 unit 178, a V42.bis unit 180, a TCP unit 182, an IP unit 184, and a PPP unit 186. Data passing through data processing unit 171 is processed by all, some or none of the formatting units depending on the configuration performed by AT/IS-99 command processor 170. Within the cellular telephone, an AT/A data processor 188 is provided along with an RLP 190 and an audio/DSP processor 192.

For CDMA operation, data received by the PC-modem card from the laptop computer is routed though the AT/IS-99 command processor 170 which forwards the appropriate commands to the cellular telephone through the serial connection port for setting up a traffic channel. The AT/IS-99 command processor 170 also activates one or more of the formatting units, such as the TCP unit or the PPP unit, for formatting the data itself. The data to be formatted is received directly from the laptop computer (i.e. the data is not routed through the AT/IS-99 command processor 170) and output directly to the serial port under control of the AT/IS-99 command processor 170.

The formatted data, once received by the cellular telephone, is routed through an AT/A data processor which responds appropriately to any AT commands contained therein and which controls transference of the actual data for transmission to the local base station. Response data signals are routed along the same path in the opposite direction with the appropriate formatting unit of the PC-modem card decoding the data, if necessary, before forwarding to the laptop computer.

For AMPS operation, data signals provided from the laptop computer are also processed by the AT/IS-99 command processor 170 which transmits appropriate signals to the cellular telephone for setting up a traffic channel. The data itself is routed, under the control of the AT/IS-99 command processor 170, through data processor 171, modem 172 and CODEC 174 for transmission as PCM signals to the cellular telephone. In an alternative embodiment, not separately shown, the CODEC may be provided as part of the interconnection line itself. Also, as noted, a separate data pump unit may be provided.

Within the cellular telephone, the PCM-encoded signals are routed to the audio/DSP processor. Additionally, AT commands are routed to the AT/A data processor. The AT/A data processor responds to the AT commands, such as dial commands, and transmits the appropriate responsive signals to the PC-modem card. The actual data for AMPS transmission is processed by the audio/DSP processor in accordance with otherwise conventional techniques and forwarded to the receive/transmit unit for transmission to the local base station. Responsive data signals are routed along the same path in the opposite direction through the CODEC and modem of the PC-modem for subsequent forwarding to the laptop computer.

In the alternative embodiment of FIG. 6 the various components are partitioned between the PC-modem card and the cellular telephone in much the same way, but the TCP, IP and PPP units are provided within the cellular telephone, rather than within the PC-modem card. Like components of embodiment of FIG. 6 are identified with like reference numerals incremented by one hundred. The components and their operation will not be re-described.

In either of the embodiments of FIGS. 5 and 6, the combination of the PC-modem and the cellular telephone operates as an IS-99 MT2 interface in accordance with the EIA/TIA IS-99 specifications for modem emulations and IS-657 emulation for packet services. The V42.bis is employed for data compression. The PC-modem performs IS-99 AT command processing. It should be noted that this is somewhat in contrast with the IS-99 specification which implies, but does not require, that all IS-99 services are to, be performed within the cellular telephone itself.

As far as IS-657 packet data services are concerned, the PC-modem is configured to allow incoming and outgoing packet service calls and to provide circuitry, software or other means for originating a packet call. In this regard, the PC-modem is capable of transitioning into and out of packet operation mode. A packet-based application originates a packet service call by issuing AT commands to set the packet mode and originate a call. The PC-modem transitions to a packet pass-through mode upon reception of the packet mode command (typically AT+CRM=1). Autodetect may be employed. Upon reception of the appropriate command, the PC-modem forwards the command to the cellular telephone, and then behaves as an IS-657 compliant Rm interface (i.e., a packet interface).

Figure 7:
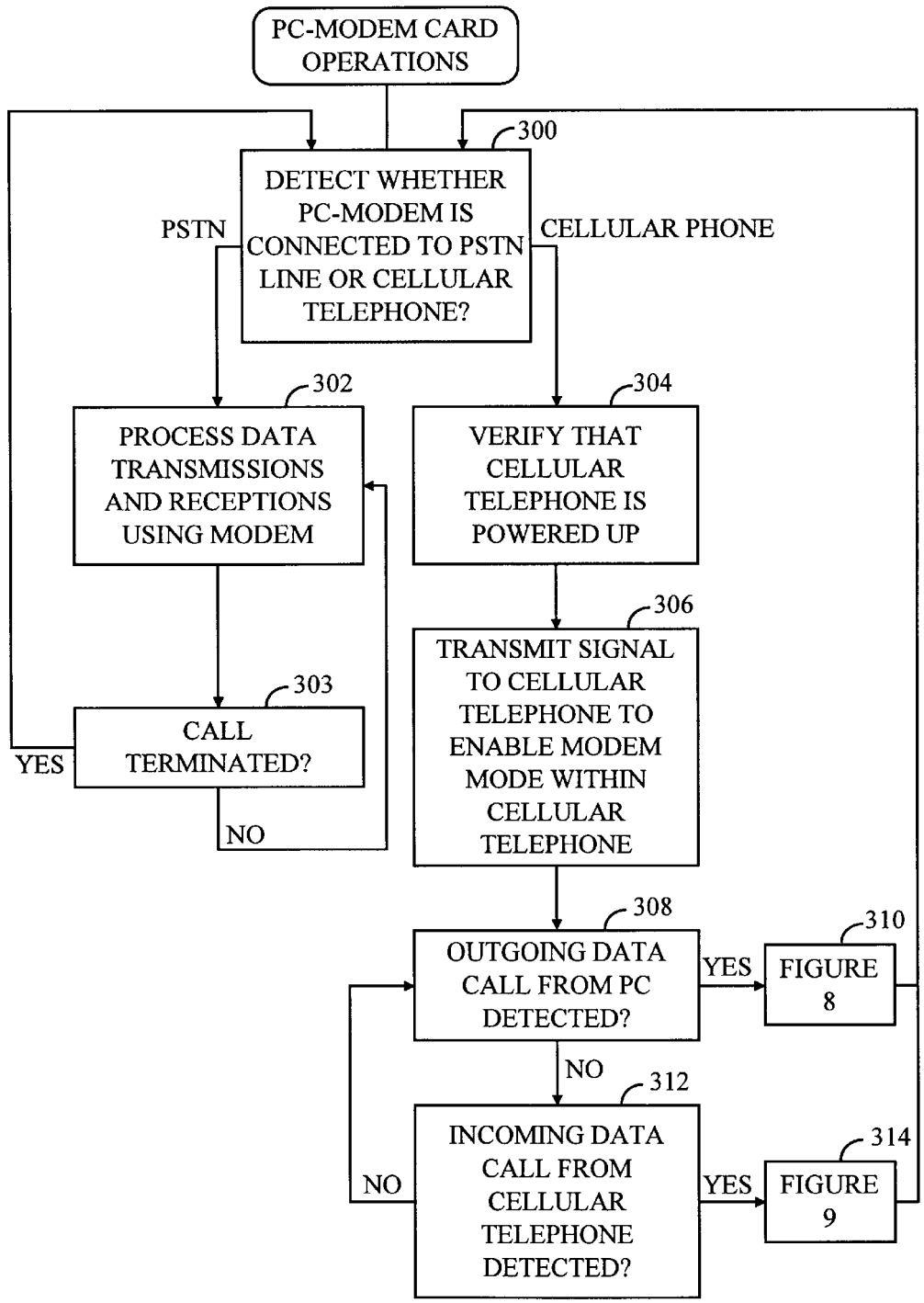
FIG. 7 is a flowchart illustrating, at a high level, operations performed by the PC-modem card of FIG. 5.
Figure 8:
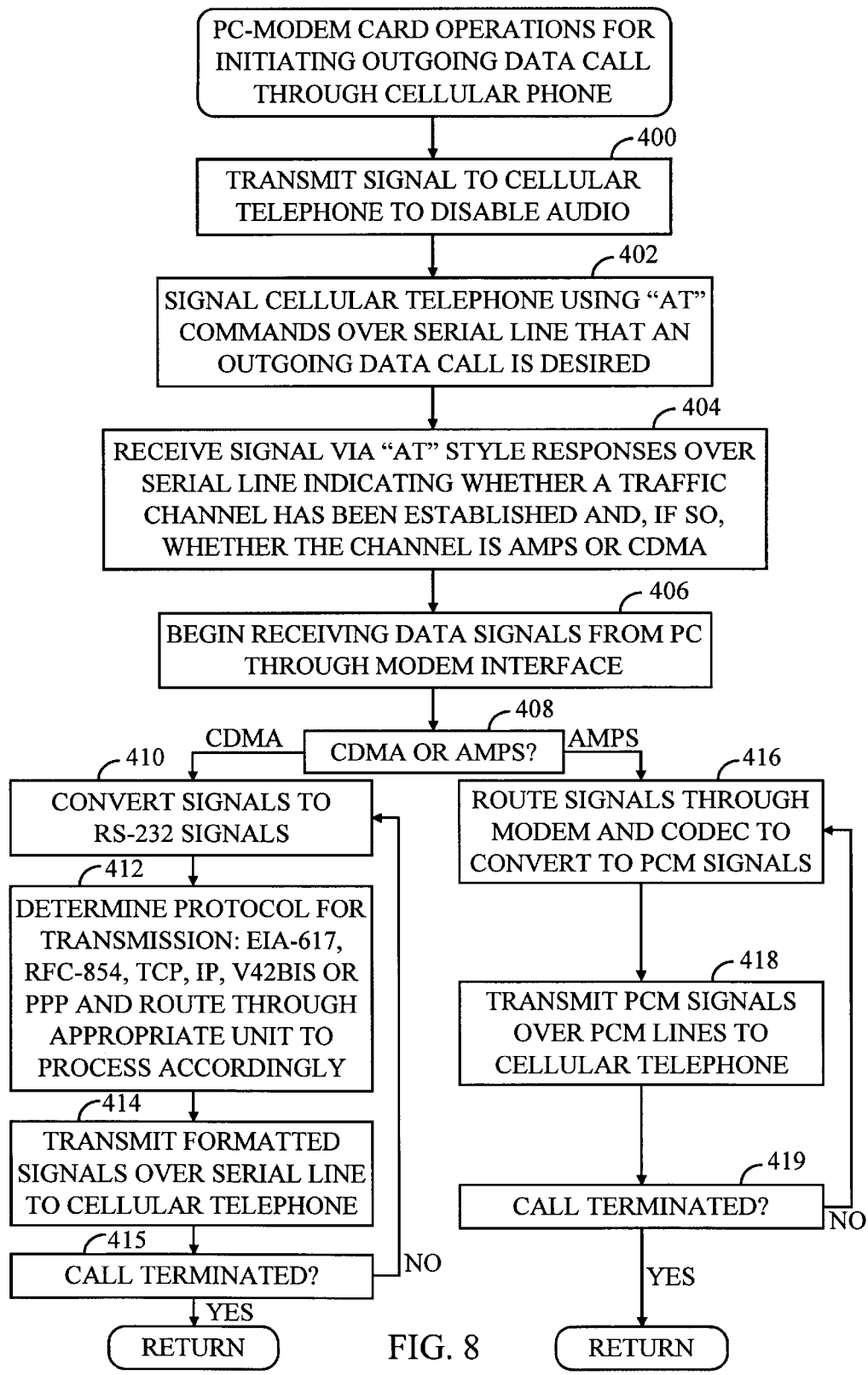
FIG. 8 is a flowchart illustrating method steps performed by the PC-modem card for use in initiating an outgoing data call through the cellular telephone.
Figure 9:
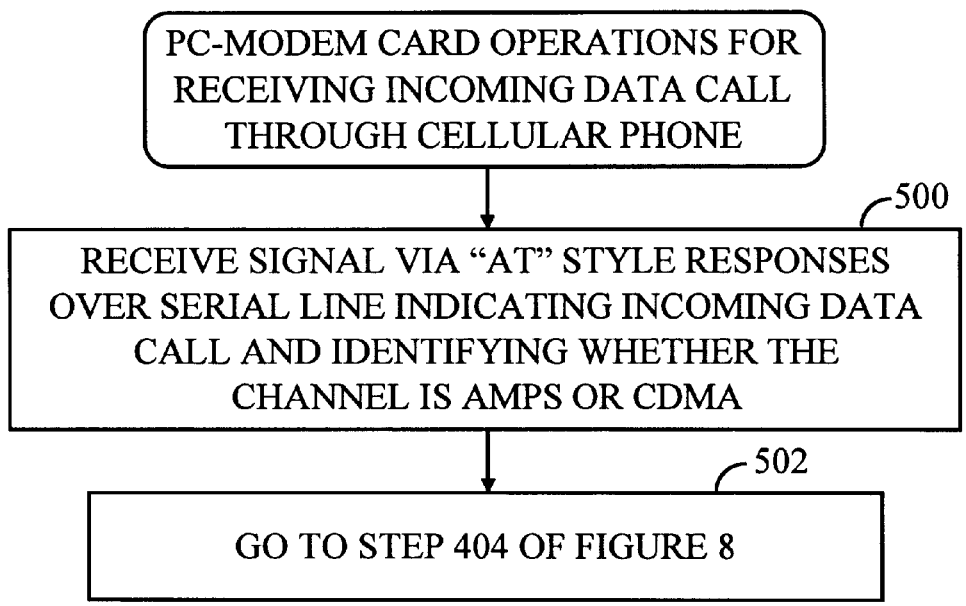
FIG. 9 is a flowchart illustrating method steps performed by the PC-modem card for use in receiving an incoming data call through the cellular telephone.

The operations performed by the PC-modem card of the embodiments described above, are set forth in FIGS. 7–9 and these methods will be briefly summarized. Referring first to FIG. 7, the PC-modem card first detects whether it is connected to a PSTN line or to a cellular telephone, step 300. If connected to a PSTN line, the PC-modem operates in conformance with otherwise conventional land line modem operations, step 302. Step 302 is repeated until the call is terminated, step 303. If connected to a cellular telephone, the PC-modem first verifies that the cellular telephone is powered up, step 304. At step 306, the PC-modem card transmits a signal to the cellular telephone to enable the PC-modem mode within the cellular telephone. If an outgoing call is detected, step 308, and the cellular telephone is not powered up an appropriate error signal is transmitted to the laptop computer. Otherwise, steps illustrated in FIG. 9 are executed. If an outgoing call is detected, then steps illustrated in FIG. 8 are executed. In either case, execution ultimately returns to step 300.

Referring now to FIG. 8, the operations performed by the PC-modem card for initiating an outgoing call through the cellular telephone will briefly be described. Initially, at step 400, the PC-modem card transmits a signal to the cellular telephone to disable audio so that the operator of the cellular telephone need not listen to the transmission of data. Then, at step 402, the cellular telephone is signaled using AT commands using the serial line to indicate that an outgoing data call is requested. At step 404, the PC-modem receives AT style responses over the serial line indicating whether a traffic channel has been opened and, if so, indicating whether the traffic channel is an AMPS channel or a CDMA channel. At step 406, the PC-modem card begins receiving data from the laptop computer through the modem interface. Following step 408, if the traffic channel is CDMA, execution proceeds to steps 410–415 or, if AMPS, to steps 416–419.

More specifically, if CDMA, the PC-modem first converts the signals received from the laptop computer to RS-232E signals, step 410. Then, the PC-modem performs any data formatting and/or data compression required, such as applying TCP or PPP formats or employing V42.bis data compression. At step 414, the resulting compressed and encoded signals are transmitted over the serial lines as RS-232E signals to the cellular telephone for subsequent conversion therein to CDMA signals. Steps 410–414 are repeated until the call terminated.

If the traffic channel is AMPS, then at step 412, the received signals are routed through the modem and CODEC for conversion to PCM signals. The PCM signals, at step 414, are transmitted over the PCM audio lines over the interconnection cable to the cellular telephone for conversion therein to AMPS signals for subsequent transmission. Steps 416–418 are repeated until the call is terminated, step 419. Whether CDMA or AMPS, eventually execution returns to FIG. 7 for processing of additional outgoing calls or incoming calls.

Referring now to FIG. 9, the operation of the PC-modem call in response to incoming data transmissions received through the cellular telephone will now be described. Initially, at step 500, the PC-modem card receives AT style responses over the serial lines of the interconnection cable indicating incoming data and identifying whether the corresponding traffic channel is an AMPS or a CDMA channel. Then at step 502, the processing proceeds to step 404 of FIG. 8 where the call is set up in similar fashion to the computer initiated telephone call.

The methods described with respect to FIGS. 7–9 may be performed by the apparatus embodiments of FIGS. 2–6, or by other embodiments as well. Likewise, the apparatus illustrated in FIG. 2–6 may be operated to perform method steps other than those specifically shown in FIGS. 7–9.

What has been described is a cellular telephone system providing integrated AMPS and CDMA capabilities. Hardware and software units employed to perform appropriate data processing are provided using a cellular telephone and a PC-modem card. Two specific partitioning schemes for these components have been set forth. Other embodiments having other arrangements of components may be provided consistent with the principles of the invention. The embodiments described herein should merely be regarded as illustrating the invention and should not be construed as limiting the scope of the invention. Indeed, principles of the invention are applicable to other combinations of cellular transmission formats including FDMA, TDMA, etc. Also, principles of the invention are applicable to other types of mobile transmission devices besides cellular telephones.

What is claimed is:

1. A system for transmitting data received from a data source, said system comprising:

a PC-modem card for connecting to the data source; and
 a cellular telephone connected to the PC-modem card;
 wherein the PC-modem card includes:
   means for transferring data between the data source and the cellular telephone; and
 wherein the cellular telephone includes
   AMPS processing means for receiving data from the PC-modem card and transmitting the data using AMPS format signals;
   CDMA processing means for receiving data from the PC-modem card and transmitting the data using CDMA format signals;
   an AT/A data processor;
   an RLP; and
   an audio/DSP.

2. The system of claim 1 wherein the AMPS processing means includes means for receiving AMPS signals from a remote source and for transferring data contained therein to the PC-modem card; and wherein the CDMA processing means includes means for receiving CDMA signals from a remote source and for transferring data contained therein to the PC-modem card.

3. The system of claim 1 wherein the means for transferring data between the between the data source and the cellular telephone includes means for determining whether the data is to be transmitted by the cellular telephone using AMPS or CDMA.

4. The system of claim 3 wherein the means for determining assumes that the data is to be transmitted as CDMA signals and selects AMPS only if CDMA is unavailable.

5. The system of claim 3 wherein the means for determining assumes that the data is to be transmitted as CDMA signals and selects AMPS only if CDMA is unavailable in a first mode, and transmits data as CDMA signals if CDMA is selected, and as AMPS signals if AMPS is selected.

6. The system of claim 1 wherein the means for transferring of the PC-modem card includes means for converting signals received from the data source into PCM signals for transmission to the cellular telephone; and wherein the AMPS processing means of the cellular telephone includes means for receiving the PCM signals from the PC-modem card and for converting the signals to AMPS format signals.

7. The system of claim 6 wherein the means for converting includes a modem and a CODEC circuit.

8. The system of claim 1 wherein the means for transferring of the PC-modem card includes means for converting signals received from the data source into analog audio samples for transmission to the cellular telephone; and wherein the AMPS processing means of the cellular telephone includes means for receiving the analog audio samples from the PC-modem card and for converting the signals to AMPS format signals.

9. The system of claim 3 wherein the means for transferring of the PC-modem card includes means for converting signals received from the data source into RS-232E signals for transmission to the cellular telephone; and wherein the CDMA processing means of the cellular telephone includes means for receiving the RS-232E signals from the PC-modem card and for converting the signals to CDMA format signals.

10. The system of claim 9 wherein the means for transferring of the PC-modem card includes means for processing received data in accordance with a format selected from the group of formats including AT/IS-99, EIA-617, RFC854, V42.bis, TCP, IP, and PPP.

11. The system of claim 1 wherein the CDMA processing means of the cellular telephone includes:

means for performing modem emulation using IS-99 format; and means for performing packet services using IS-657 format.audio/DSP.

12. The system of claim 1 wherein the cellular telephone further includes:

a speaker and a microphone;

means for determining whether an AMPS telephone call is a data call or a voice call; and means for routing audio signals to and from the microphone and speaker for AMPS voice calls and for routing the audio signals in the form of PCM signals to and from the PC-modem card for AMPS data calls.

13. The system of claim 1 wherein the PC-modem card includes means for determining whether the cellular telephone is operational.

* * * * *